(12) United States Patent
Abadi et al.

(10) Patent No.: US 6,480,502 B1
(45) Date of Patent: Nov. 12, 2002

(54) METHOD FOR AVOIDING BROADCAST DEADLOCKS IN A MESH-CONNECTED NETWORK

(75) Inventors: Martin Abadi, Palo Alto, CA (US); Thomas Lee Rodeheffer, Mountain View, CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/079,543

(22) Filed: May 15, 1998

(51) Int. Cl.⁷ .............................. H04J 3/26; H04L 12/28
(52) U.S. Cl. ...................... 370/432; 370/254; 370/390
(58) Field of Search ................... 370/252, 253, 370/254, 255, 256, 432, 428, 400, 401, 402, 404, 406, 392, 389, 457, 390, 408; 709/220, 221, 222

(56) References Cited

U.S. PATENT DOCUMENTS

| | | | |
|---|---|---|---|
| 5,056,085 A | * | 10/1991 | Vu .............................. 370/400 |
| 5,088,091 A | | 2/1992 | Schroeder et al. |
| 5,138,615 A | | 8/1992 | Lamport et al. |
| 5,179,558 A | | 1/1993 | Thacker et al. |
| 5,245,607 A | * | 9/1993 | Caram ........................ 370/256 |

OTHER PUBLICATIONS

Schroeder er al.; "Autonet: A High–Speed, Self–Configuring Local Area Network Using Point–to–Point Links" Apr. 1990.

* cited by examiner

Primary Examiner—Steven Nguyen
(74) Attorney, Agent, or Firm—Oppenheimer Wolff & Donnelly LLP; Leah Sherry

(57) ABSTRACT

A method for broadcasting packets in a network that includes a plurality of switches. The network can logically be represented by a spanning tree plus cross-links. In order to avoid deadlock during a broadcast, a broadcast packet is sent from an originating switch to a root switch of the network, and a copy of the packet is sent from a current switch to all descendant switches when all copies of the packet have been received in the current switch.

24 Claims, 4 Drawing Sheets

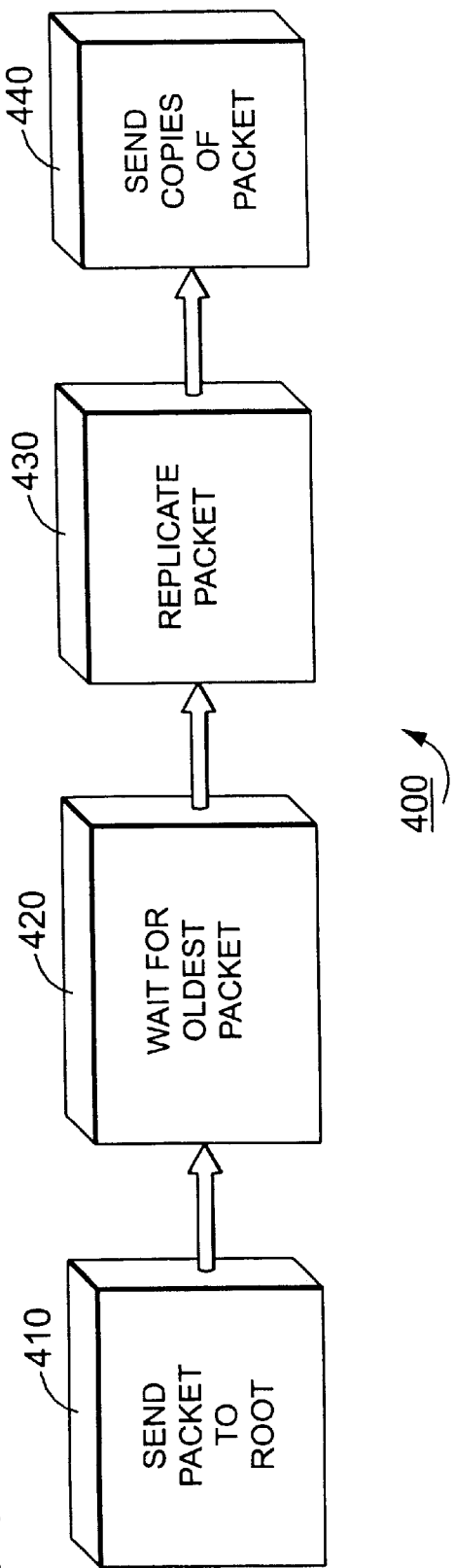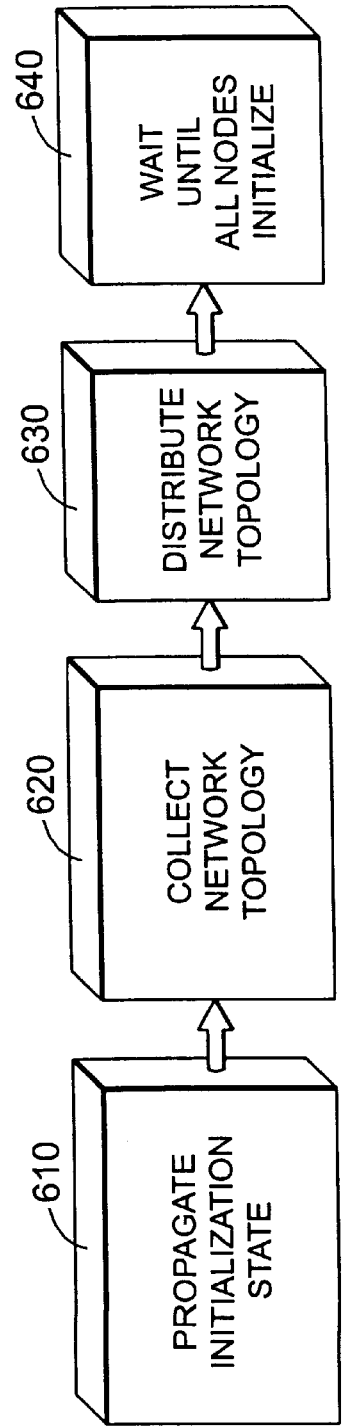
FIG. 4
FIG. 6

METHOD FOR AVOIDING BROADCAST DEADLOCKS IN A MESH-CONNECTED NETWORK

FIELD OF THE INVENTION

This invention relates generally to broadcasting packets in a communications network including switches, and more particularly to avoiding deadlock during a broadcast of packets.

BACKGROUND OF THE INVENTION

One type of local area mesh-connected network that can be used to broadcast message packets is called a cut-through network. In a cut-through network, switches forward packets from sources to destinations without necessarily storing complete packets in switch buffers at any point in time. Cut-through networks are contrasted with traditional store-and-forward networks where each packet is fully buffered in each switch through which the packet passes.

Cut-through networks offer advantages in performance and cost. A cut-through network is logically represented by a spanning tree. A spanning tree can be represented as a graph of nodes and edges, where the nodes represent the switches and the edges represent the links between the switches. Point-to-point packets can be forwarded both on links and on cross-links. Cross-links are links that are not part of the spanning tree. The use of all links, including cross-links, offers advantages in utilization for point-to-point communication.

One cut-through network is the "AN1" network, originally known as "Autonet." This cut-through network is a high-speed self-configuring local area network. This cut-through network is described by Schroeder et al. in "Autonet: A High-speed, Self-configuring Local Area Network Using Point-to-Point Links," SRC Research Report 59, Apr. 30, 1990. See also, Schroeder et al., "High-speed Mesh-connected Local Area Network," U.S. Pat. No. 5,088,091, issued Feb. 11, 1992.

In a cut-through network such as the Autonet, broadcast packets are directly forwarded "up" the spanning tree to the root switch, and from there the broadcast packet is "flooded" "down" the spanning tree to all destinations. Cross-links are not used. Here, flooding means that the broadcast packet is replicated on all spanning tree links leading "downward" out of a switch. The terms up and down are used to indicate that the links in the spanning tree have some determinable ordering.

The AN1 or Autonet network avoids deadlocks by placing restrictions on when broadcast packet can be stopped, and ensuring that the buffers are big enough to hold all of any broadcast packet. For non-broadcast packets it may be inconvenient or impractical to place a limit on their lengths. The prior approach limits the maximum length of broadcast packets to no more than ½ of the buffer size at switches. The limit on broadcast packets complicates host and bridge network software, especially if the maximum length of a broadcast packet is less than the maximum length of a non-broadcast packet. The minimum requirement of buffer space can make the switches more expensive. The deadlock problems of the prior art network are described in detail in Section 6.6.6 of SRC Research Report 59.

Therefore, there is a need for a network that avoids deadlock during the broadcast of packets without having any size restrictions on buffers used in the network to store the packets during the broadcast.

SUMMARY OF THE INVENTION

The invention provides a method for broadcasting packets in a network including a plurality of switches. The network is a cut-through network that can logically be represented by a spanning tree and cross-links.

A broadcast packet is directly sent from an originating switch to the root switch of the network. At this point the root switch can be considered the current switch.

Copies of the packet are sent from the current switch to all descendant switches when all copies of the packet have been received in the current switch to avoid deadlock during the broadcasting of the packets. Descendant switches are those switches that are connected by downward directed links from the current switch. A downward directed link can be a spanning tree link or a cross-link.

In one aspect of the invention, the current switch simultaneously sends the copies of the packet to the descendant switches. In another aspect, the copies of the packet sent on cross-links are represented by tokens identifying the packet.

In case of a network failure the network is initialized by propagating an initialization state to all switches, collecting the network topology, distributing the network topology to all switches, and waiting until all switches are initialized before resuming operation.

BRIEF DESCRIPTION OF THE DRAWINGS

FIG. 4 is a flow graph of a method for avoiding deadlock in the network of FIG. 1 during broadcasting of packets;

FIG. 6 is a flow diagram of an initialization method used by the invention.

DETAILED DESCRIPTION OF PREFERRED EMBODIMENTS

Figure 1:
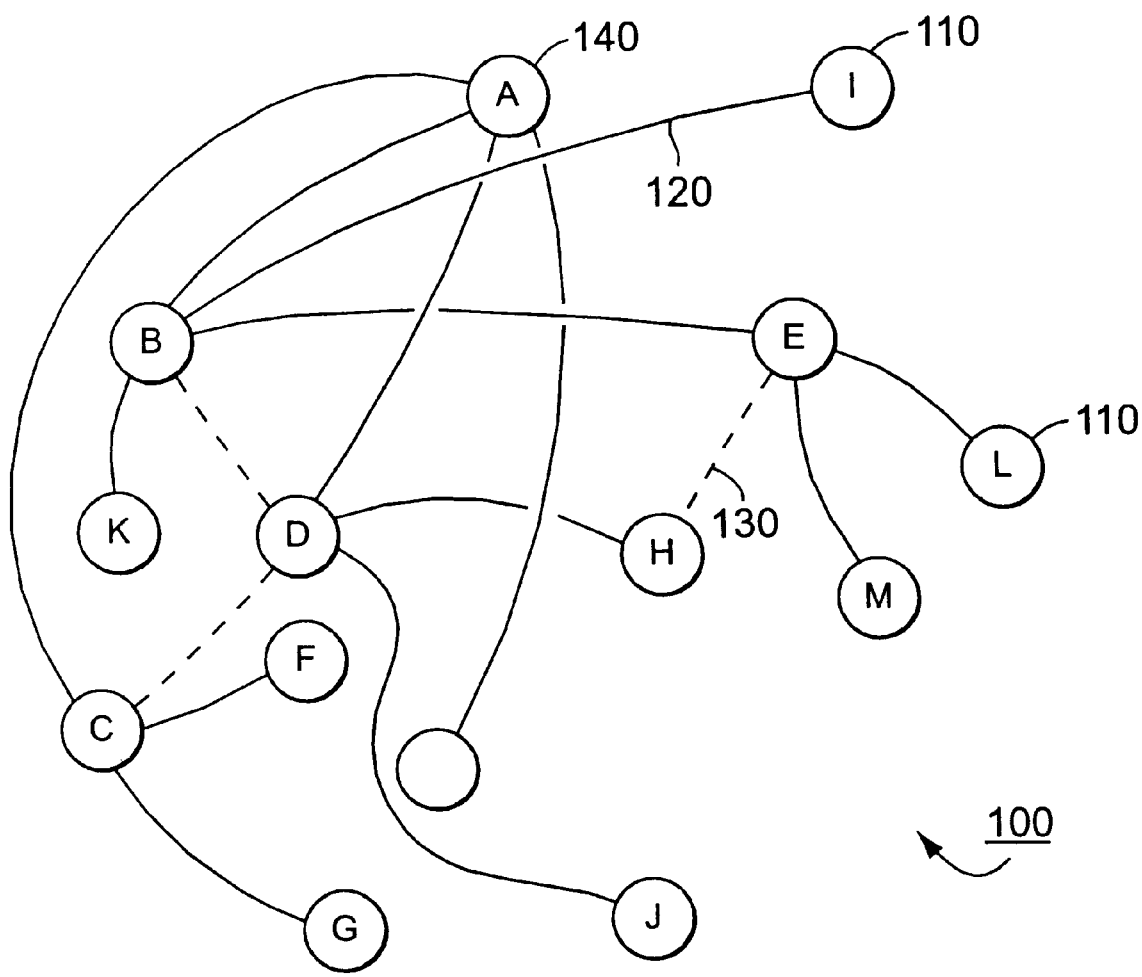
FIG. 1 is a diagram of a local area mesh-connected network including a plurality of switches connected by communications links.

As shown in FIG. 1, a network 100 includes a plurality of routing switches 110. The switches 110 are connected by links 120. Some the links are cross-links 130. One switch is designated as a "root" switch 140.

Figure 2:
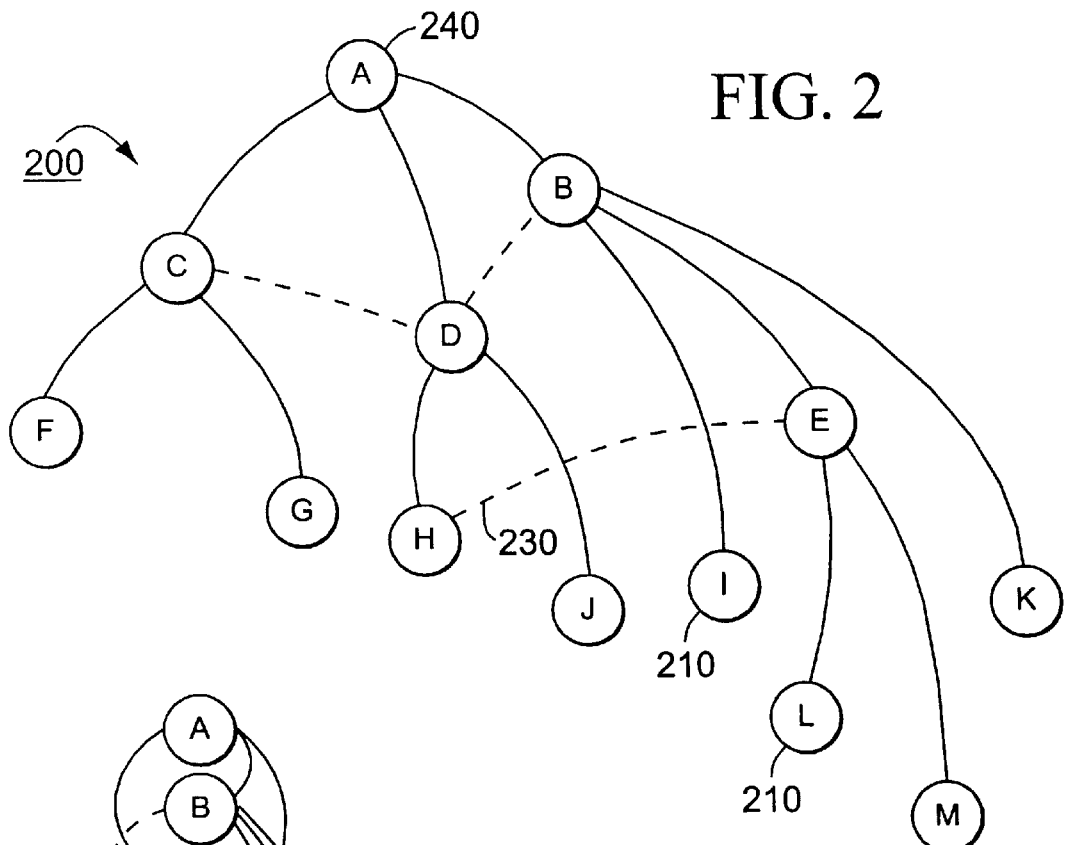
FIG. 2 is a graph that logically represents the network of FIG. 1.

FIG. 2 shows a spanning tree 200 that logically represents the network 100 of FIG. 1. In the graph 200, nodes 210 represent the switches, and edges 230 represent the links. Edge 230 represents the cross-link 130 in FIG. 1. Node 240 represents the root of the spanning tree 200. Although parts of the invention are described with reference to the logical representation of the network 100 in the spanning tree 200 for clarity, it should be clear that in practical applications, the nodes and edges of the spanning tree are nothing more than high-speed electronic switches and communication paths.

Figure 3:
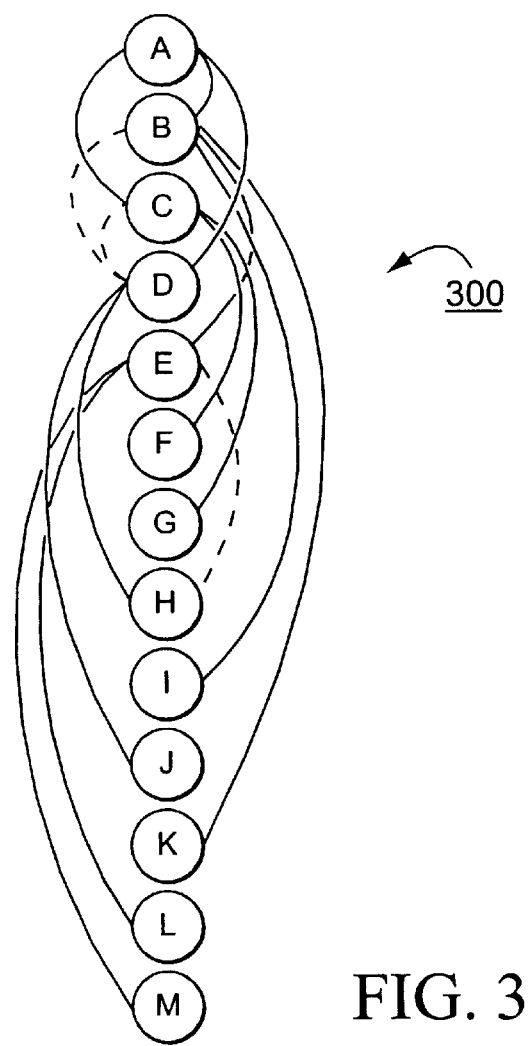
FIG. 3 is a graph showing the ordering of switches for the purpose of identifying up and down links.

As in the Autonet described above, packets are forwarded according to an up/down rule based on the spanning tree. The up/down rule is easily explained with reference to FIG. 3. Here, the nodes and links are put in some arbitrary order, for example, by name, address, location, or some other identification. An originating point-to-point packet is forwarded to its intended destination by following some number of links in the upward direction, then following some number of links in the downward direction.

FIG. 4 shows the steps of a method for broadcasting packets in a cut-through network that avoids deadlocks. In step 410, a broadcast packet is forwarded all the way up to the root node. From the root node the packet descends down the links to leaf nodes with replication at all branching nodes. However, with the invention, cross-links are also used during a broadcast. The cross-links can be oriented in any arbitrary manner as long as "loops" are avoided. As stated above, cross-links are not part of the spanning tree.

At this point for the purpose of this description, the root node can be considered an initial "current" node. In step 420, The switch at the current node waits until the oldest packet on each of the switch's incoming downward links is a packet of a descending broadcast. After the oldest packet has arrived at the current node, the packet is replicated for each of outgoing downward links in step 430. The replicated copies of the broadcast packet are sent out on the current switch on all of the outgoing downward links in step 440. Note, when the current node is the root node, the sending can take place immediately since there is only one incoming copy of the packet.

Because the current switch serializes broadcasts, only one broadcast packet at a time starts descending the spanning tree from the root, and the oldest descending broadcast packet on each of the incoming downward links must be a copy of the same packet. When the oldest packet on each of the switch's incoming downward links is a descending broadcast the switch has a complete match of copies of descending broadcast packets on all of its incoming downward links. The switch is now ready to forward the descending broadcast packet.

In step 440, the switch can forward a copy of the packet from an arbitrary one of the incoming downward links, and discards the other copies of the packet. The switch forwards the descending broadcast packet simultaneously on all of its outgoing downward links, including cross-links.

Figure 5:
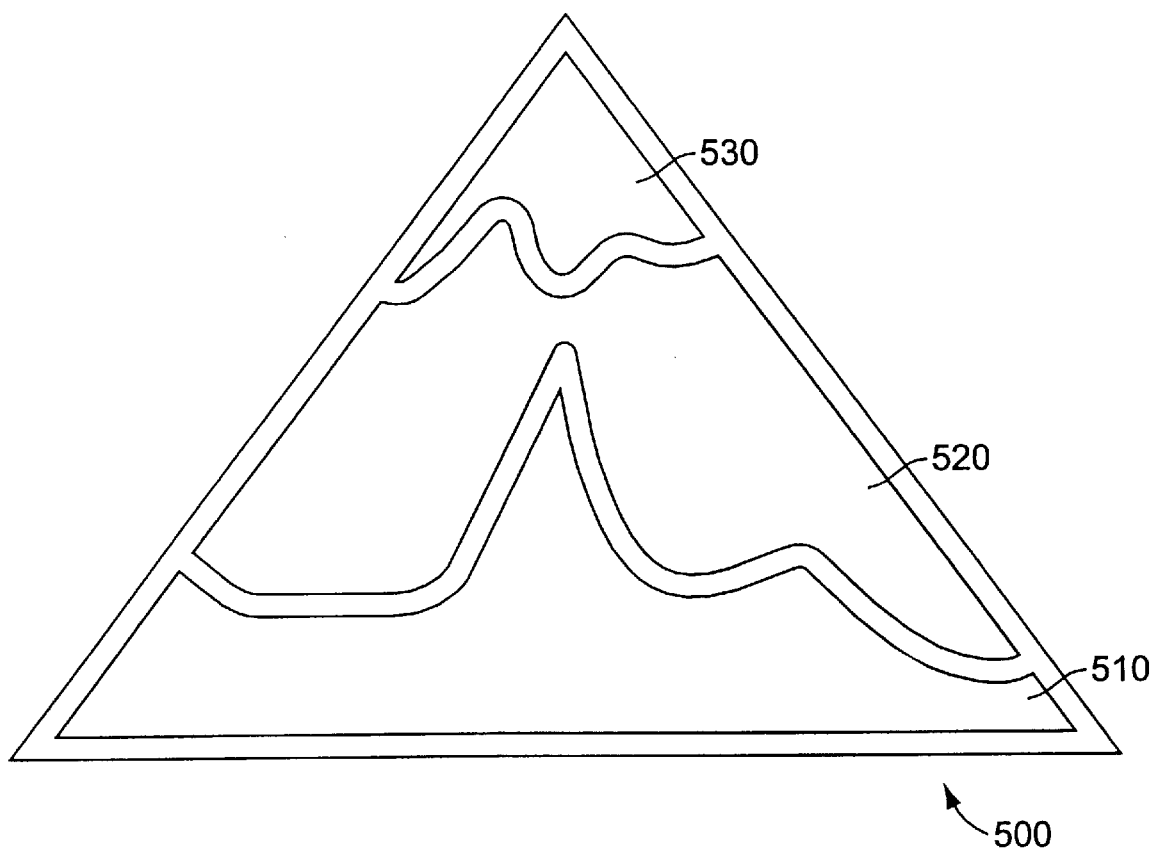
FIG. 5 is a schematic of serialized network broadcasts according to the invention.

The effect of serializing broadcasts can be visualized in FIG. 5. Here, the spanning tree is represented by a triangle 500. Areas 510, 520, and 530 are portions of the spanning tree occupied by serialized broadcasts, for example, all packets in area 510 belong to the same broadcast, and area 520 is occupied by packets of a next broadcast. As long as current nodes wait for the oldest packet of a broadcast, the areas 510, 520, and 530 will never overlap, and consequently deadlocks are avoided.

The following variations and embellishments can be incorporated. Some of these are useful in dealing with faults, and initialization of the network. First, as an optimization, copies of broadcast packet are only forwarded on spanning tree links, and not on cross-links. The cross-links carry small "tokens" representing the packet, not the entire packet itself. For example, the token can just be the header information sufficient to identify the broadcast packet.

Alternatively, a switch having multiple incoming links discards all but one copy of the descending broadcast packets, for example, only the last copy. When all copies have arrived, the retained copy of the packet is forwarded.

In any network, failures to receive a packet are expected. A failure can be due to a complete loss or corruption of a packet on the network. In addition, the network may encounter spurious packets. In the case of a failure, a switch may get stuck waiting for all of the copies of a broadcast packet.

This is a serious problem because, as described herein, switches can only forward or discard the oldest packet.

Indeed, a consequence of a failure, large portions of the entire network may become stuck in a chain reaction through flow-control back-pressure.

One solution to this problem is for the switch to use a time-out value to detect being stuck. When a predetermined amount of time has passed, the switch can clear the problem by initializing the entire network, i.e., the network is re-booted.

Initialization is an acceptable remedy when communication errors are infrequent. However, the time-out value must be set long enough to avoid false alarms possibly due to transient network congestion and low enough to detect stuck states without too much delay. An appropriate choice for the time-out value would be comparable with the amount of time it takes to reboot the network.

A failure can also result in a state where each of the oldest packets on each of downward links to a switch is a broadcast packet, but the oldest packets do not necessarily belong to the same broadcast. In this situation, there is a mismatch on the broadcast packets.

If new broadcast packets enter the network quickly enough, then a switch may never remain stuck long enough to time out, and could continue to mismatch broadcasts. This is a serious problem because the system would be operating in an inconsistent state, which could result in: incorrect behavior such as some leaf-nodes seeing omission of some broadcast packets and repetition of others; and unreasonably poor throughput in the network because a switch could spend most of its time stuck, although never long enough to time out. In the latter case, the switch would be stuck not for any reason of network congestion, which could be deemed reasonable, but because the state of the system is inconsistent.

Mismatched broadcasts can be detected as follows. Each broadcast packet has an associated identifier so that all packets that are present in the network at any one time are uniquely identifiable with a particular broadcast. Given the packet identifier, each switch associates the identifier with a broadcast.

In the case of a mismatch, the switch can clear the problem by re-booting the network. The identifier can be inserted in a packet at any point before the spanning-tree root node forwards the descending broadcast. One method is to have the root switch write a sequence number into each broadcast packet just prior to forwarding it. Another method is to have the original sender write a sequence number and a unique identifier of the sender in each packet. Hash codes can be used to reduce the number of bits required for the identifier.

Initialization

Initialization, foremost, requires that the network is put into a consistent state. According to the invention, initialization proceeds in four phases as shown in steps 610, 620, 630, and 640 of FIG. 6.

(1) propagating of an initialization state to all switches which clears all packets, and erases all routing information;

(2) collecting the network topology;

(3) distributing the network topology to all switches; and (4) waiting until all switches are initialized before resuming operation.

After a switch obtains the new topology in step 630, the switch determines new routing information, and resumes processing packets. In general, initialization can happen at different switches at different times, and initialization could cause a switch A to forward a packet to a switch B that has not yet been initialized. In this case, switch B will discard the packet.

In the prior art network, this may have been acceptable. However, in the context of this description, this is not acceptable because discarding a "descending" broadcast packet may result in an inconsistent network state resulting in an endless cycle of re-boots.

Therefore, during the fourth phase of the initialization according to the invention, nodes report that they are ready to handle descending broadcast packets, and the spanning-tree root discards, rather than forwards as in the prior art, all broadcast packets until the completion of this additional fourth phase.

The techniques described above guarantee that when a broadcasting switch wants to acquire a resource, it holds all immediately upstream resources. No other packets can hold a resource and at the same time desire to hold an upstream resource. Hence, the system cannot suffer deadlock.

These techniques do not impose any restriction on the maximum length of a broadcast packet, nor any restriction relating the maximum length of a broadcast packet to the minimum size of a switch input buffer.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A method for broadcasting packets in a network with a plurality of switches, links and cross-links, the network being logically represented by a spanning tree, wherein the spanning tree identifies a root switch and one or more descendant switches, the method comprising the steps of:
    sending copies of a broadcast packet of a broadcast from the root switch to all descendant switches; and
    at each descendant switch considered as the current switch,
        waiting to receive at the current switch a copy of the broadcast packet of the broadcast from each switch for which the current switch is a descendent switch,
        then selecting one of the copies of the broadcast packet of the broadcast, and
        forwarding copies of the selected copy of the broadcast packet of the broadcast to all descendents of the current switch.

2. A method for broadcasting packets as recited in claim 1, further comprising, prior to sending copies of a broadcast packet from the root switch, receiving a broadcast packet from a descendent switch at the root switch.

3. A method for broadcasting packets as recited in claim 1, further comprising, prior to sending copies of a broadcast packet from the root switch, receiving a broadcast packet from a host at the root switch.

4. A method for broadcasting packets as recited in claim 1, wherein sending copies of the broadcast packet from the root switch includes transmitting simultaneously the copies of the broadcast packet from the root switch.

5. A method for broadcasting packets as recited in claim 1, wherein forwarding copies of the selected copy of the broadcast packet from the current switch includes transmitting simultaneously the copies of the broadcast packet from the current switch.

6. A method for broadcasting packets as recited in claim 1,
    wherein the current switch is connected by a cross-link to a switch for which the current switch is a descendent switch; and
    wherein a copy of the broadcast packet sent on the cross-link is represented by a token that identifies the broadcast packet with the broadcast.

7. A method for broadcasting packets as recited in claim 6, wherein the token includes header information that identifies the broadcast packet.

8. A method for broadcasting packets as recited in claim 1, further comprising, prior to forwarding copies of the selected copy of the broadcast packet,
    retaining, at the current switch, the selected copy for forwarding; and
    discarding, at the current switch, all other copies of the broadcast packet.

9. A method for broadcasting packets as recited in claim 1,
    wherein the step of waiting to receive at the current switch the copies of the broadcast packet from all the switches for which the current switch is a descendent switch includes
        determining that a failure has occurred if a predetermined amount of waiting time elapsed, and
        initializing the network if the failure occurred.

10. A method for broadcasting packets as recited in claim 9, wherein the predetermined amount of time is comparable to an amount of time it takes to initialize the network.

11. A method for broadcasting packets as recited in claim 9, wherein the step of initializing the network includes:
    propagating an initialization state to all switches;
    collecting the network topology;
    distributing the network topology to all switches; and
    waiting until all switches are initialized before resuming normal operation.

12. A method for broadcasting packets as recited in claim 1, wherein there are at least two concurrent broadcasts present in the network.

13. A method for broadcasting packets as recited in claim 12, further comprising the step of, prior to sending any copies from the root switch of a broadcast packet for each broadcast:
    assigning an identification to each broadcast such that the identification is incorporated into each copy of the broadcast packets for each identified broadcast, wherein for each identified broadcast the identification in all the copies received at the current switch of the broadcast packet is the same.

14. A method for broadcasting packets as recited in claim 13, wherein the identification is a sequence number.

15. A method for broadcasting packets as recited in claim 13, wherein the step of assigning an identification to each broadcast includes assigning a unique identification to each broadcast.

16. A method for broadcasting packets as recited in claim 12,
    further comprising, prior to sending copies of a broadcast packet from the root switch, originally receiving a broadcast packet from a switch other than the root switch; and
    wherein assigning a unique identification to a broadcast packet of a broadcast includes assigning an identification to a broadcast packet of a broadcast by the other switch.

17. A method for broadcasting packets as recited in claim 1, wherein the step of sending copies of a broadcast packet of a broadcast from the root switch to all descendant switches includes starting the sending of copies of the broadcast packet from the root switch to all descendent switches before storing a complete broadcast packet at the root switch.

18. A method for broadcasting packets as recited in claim 1, wherein the step of forwarding copies of the selected copy of the broadcast packet of the broadcast to all descendents of the current switch includes starting the forwarding of copies of the selected copy of the broadcast packet of the broadcast to all descendents of the current switch before storing a complete copy of the broadcast packet from each switch for which the current switch is a descendent switch.

19. A method for broadcasting packets as recited in claim 1, further comprising the step of:

sending point-to-point packets in the network concurrently with sending, receiving, selecting, or forwarding broadcast packets in the network.

20. A method for broadcasting packets in a network with switches one of which being a root switch and others of which being descendent switches connected via links capable of having upward and downward orientation and cross-links capable of having loop-avoiding-arbitrary orientation, the method comprising the steps of:

flooding, from the root switch down the spanning tree, the packet of a particular broadcast received by the root switch, wherein broadcasts received by the root switch are serialized in order to start descending the respective packet of only one broadcast at a time; and at each descendant switch considered as the current switch, waiting until the current switch receives a replica of the packet of the particular broadcast at each of the downward oriented links leading to it, and forwarding to each descendent switch of the current switch, if any exists, one or more replicas of a selected packet replica from the packet replicas received at the current switch for the particular broadcast.

21. The method of claim 20, wherein the non-selected packet replicas are discarded.

22. The method of claim 20, wherein the packet and all its replicas are identified to their respective broadcast.

23. The method of claim 20, wherein each broadcast is identified by a serial number which is assumed by its respective packet and packet replicas in order to identify them with that broadcast.

24. A network for avoiding packet broadcast deadlocks, comprising:

switches one of which being a root switch that functions as an initial current switch for each incoming broadcast packet, the root switch being configured to serialize the incoming broadcast packets, and any of the switches in the network other than the root switch being a descendant switch that functions as a current switch for one or more replicas of each broadcast packet that descends to it from the root switch;

links capable of having upward and downward orientation; and cross-links capable of having loop-avoiding-arbitrary orientation, wherein each of the current switches is a direct descendant of one or more switches from which it received replicas of descending broadcast packets via downward-oriented links and/or cross-links, and wherein each current switch is configured, upon receiving packet replicas on all of the downward-oriented links and/or cross-links leading to it, not to forward any packet replicas until there is a match between a particular broadcast packet and all the packet replicas received by it, whereby packet broadcast deadlocks are avoided.

* * * * *